No. 791,754. PATENTED JUNE 6, 1905.
F. DANZENBAKER.
BEEHIVE.
APPLICATION FILED OCT. 23, 1903.
2 SHEETS—SHEET 1.
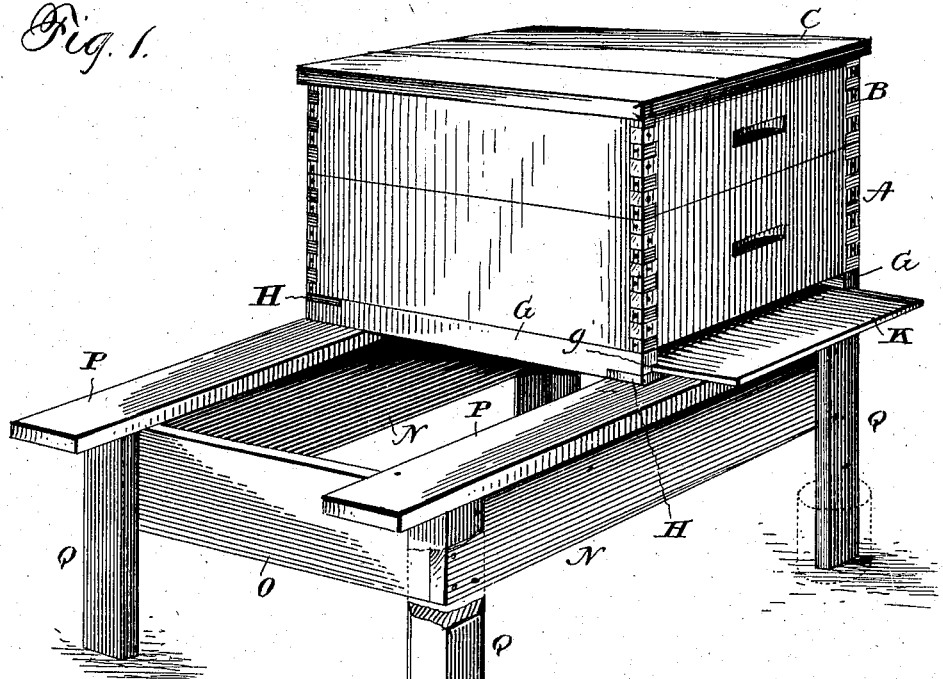
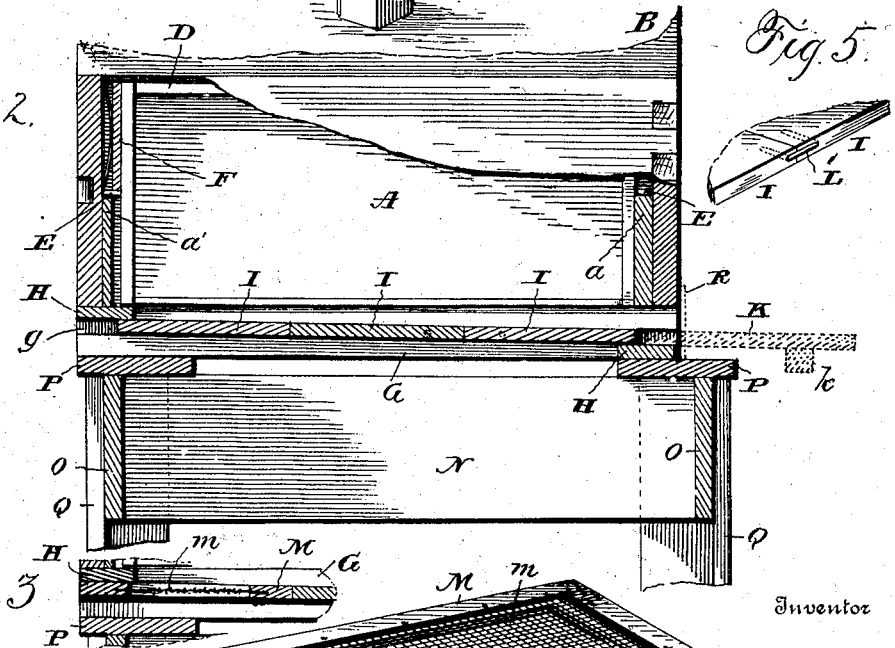
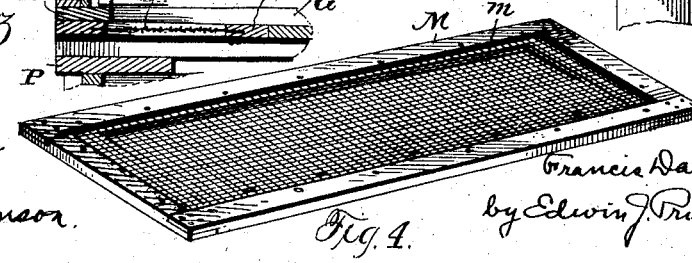
Witnesses
J. L. Lawlor.
C. D. Williamson.
Inventor
Francis Danzenbaker,
by Edwin J. Prindle, Attorney No. 791,754. PATENTED JUNE 6, 1905.
F. DANZENBAKER.
BEEHIVE.
APPLICATION FILED OCT. 23, 1903.
2 SHEETS—SHEET 2.
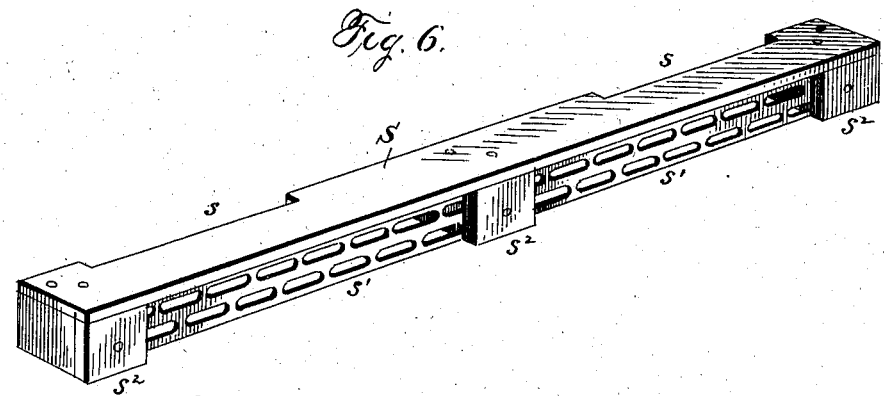
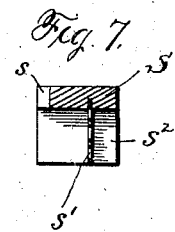 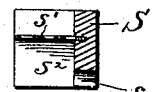
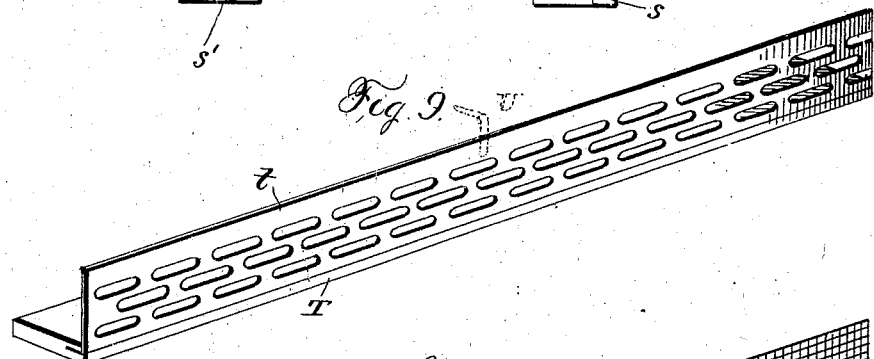
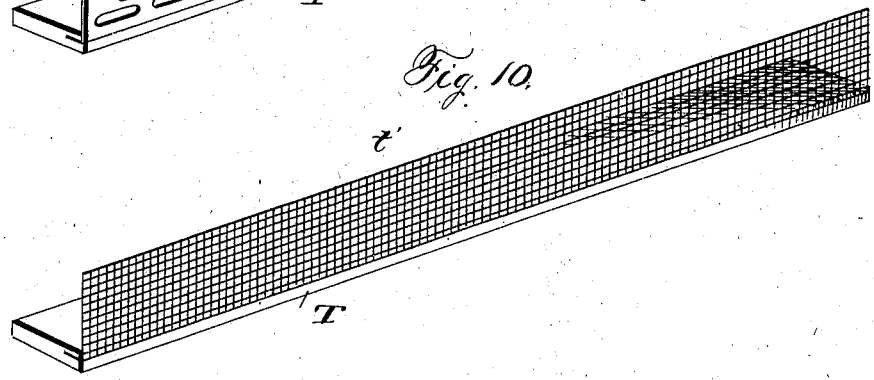

No. 791,754. Patented June 6, 1905.

UNITED STATES PATENT OFFICE.

FRANCIS DANZENBAKER, OF WASHINGTON, DISTRICT OF COLUMBIA, ASSIGNOR TO THE A. I. ROOT COMPANY, OF MEDINA, OHIO.

BEEHIVE.

SPECIFICATION forming part of Letters Patent No. 791,754, dated June 6, 1905.

Application filed October 23, 1903. Serial No. 178,234.

*To all whom it may concern:*

Be it known that I, FRANCIS DANZENBAKER, of Washington, in the District of Columbia, have invented a certain new and useful Improvement in Beehives; and I do hereby declare that the following is a full, clear, and exact description thereof, reference being had to the accompanying drawings, in which—

Figure 1 is a perspective view of a beehive and stand embodying my invention; Fig. 2, a vertical section through a part of the hive and of the stand; Fig. 3, a detail view, in vertical section, of the same, showing the arrangement of ventilating-section for the hive-bottom when the bees are to be shipped or transported; Fig. 4, a detail view in perspective of the ventilating-section shown in Fig. 3; Fig. 5, a detail view in perspective of a portion of the bottom board, showing a method of constructing the same that may be resorted to; Fig. 6, a perspective view of an entrance-closing device or stop of one construction that may be used with my hive. Fig. 7 is a detail view in section, showing said stop when arranged to serve as a queen and drone excluder. Fig. 8 is a similar section showing such stop arranged to contract the size of the entrance. Fig. 9 is a perspective view showing a simple form of drone and queen excluder that may be used with my hive-bottom, and Fig. 10 a like view of a ventilating-entrance stop that may be used with my hive-bottom.

The object of my invention is to improve the construction of beehive bottoms and stands; and to such end my invention consists in the construction employed substantially as hereinafter specified and claimed.

Referring to the drawings, A designates the brood-chamber, B the super, and C the top cover, of such a hive as that shown in my United States Patent No. 736,226, issued August 11, 1903. In the brood-chamber are frames D, that are suspended by pins E, that project from the end bars of the frame and rest on cleats $a$ and $a'$, that respectively are fastened to the front and rear walls of the hive case or body. Between the cleat $a'$ on the rear wall and the brood-frames a bee-space is left; but between the cleat $a$ and the brood-frames there is no space, the frames being pressed firmly against said cleat by a spring-pressed follower F above the narrow cleat $a'$ at the rear of the hive.

The hive-bottom comprises a pair of parallel side bars G, each having on its inner side a longitudinal slot or groove $g$, that is oblique or inclined, and a pair of end bars or slats H, that are above and below the side bars, respectively, and are joined to them, said bars making a rectangular frame corresponding in horizontal exterior dimensions to the like dimensions of the hive. With its two side edges seated in the respective grooves of the side bars is a bottom board composed of several sections I, of thin wood, the dimension of the bottom board from front to back being less than that of the frame. The bottom is so arranged in use that the rear end bar or slat H is above the bottom board, and the front bar or slat H is below the bottom board, and the latter inclines from the rear forward and downward. The inclination of the grooves, it will be perceived, gives an inclination to the bottom board, so that water, dust, &c., will gravitate therefrom, making it unnecessary to tilt the hive-stand and hive to secure the pitch of the bottom that is necessary for this purpose. The construction of the bottom is also stronger, because of the inclination of the grooves, for the latter thus run to some extent crosswise of the grain of the wood, and there is therefore less liability of the wood on the side of the groove splitting off than is the case when the grooves are parallel with the grain.

It will be observed that the construction of the bottom is such that it is reversible both end for end and top for bottom, so that in putting it in position no special attention is required other than to see that the end slats or bars are properly placed. The width of each end bar or slat H is such that it will close the bee-space left between the brood-chambers and the cleats $a'$, so that access of bees to such space to daub the brood-frames with propolis is prevented. A twofold purpose is subserved by having the front edge of the bottom board set back from the front edge of the end slat or bar H. One is the enlarged air-space that is thus provided at the entrance to the hive, said space being increased by an amount equal to the thickness of the bottom board, which is a matter of importance for ventilating during honey-flow. The other is that it enables the use of a removable alighting-board of the simplest construction and mode of attachment to the hive, for such board K may consist of a plain strip or piece of wood requiring for its attachment merely its insertion into the portions of the grooves in the side bars G that extend beyond the front edge of the bottom board. The alighting-board not being attached to the hive, the latter is thus free from any permanent projection beyond the front of the hive and may be of the same horizontal dimensions as the latter. In order to contract or close the hive-entrance, a cleat or strip $k$ is attached to one of the sides of the alighting-board such distance from one edge of the same that when the board is inserted in the grooves with the side uppermost which has the cleat upon it the latter will be in position to contract or close the hive-entrance. When the cleat or strip is not to be so used, the alighting-board is placed in position in the grooves with the side downward that has the cleat or strip.

The bottom board is preferably composed of three sections I, arranged so that the grain of the wood runs transversely of the bottom, and, if desired, all three pieces may be united together and slid into place in the grooves of the side bars G. When so united, staples L, as shown in Fig. 5, may be driven into adjoining sections to connect them, or metal strips, such as are shown applied to the front and rear edges of the bottom board of my before-mentioned patent, No. 736,226, may be used, which will both unite the sections and protect them and provide smooth surfaces that will facilitate the sliding of the bottom board in the grooves of the side bars G. Preferably, however, the construction shown in Fig. 2 is employed, wherein the front and middle sections I are attached to the side bars of the bottom by nails that pass through said bars, either vertically or horizontally, into said sections, the third and rearmost section I being removable. Said section is removed when it is desired to ship or transport the bees in the hive, and it is important to provide an adequate air-supply, and when it is removed the opening left by its removal is covered by a piece of perforated material which will prevent the passage of bees and allow the circulation of air. I preferably employ for this purpose, as shown in Figs. 3 and 4, an open frame M, across which is stretched wire-cloth $n$, which frame may be easily slid into and out of the grooves $g$ in the side bars G of the frame-bottom. To make said section reversible, so that it will be ready to be slid into place whichever side be uppermost, as well as neatly cover and protect the edges of the piece of wire-cloth, the latter is centrally situated in the frame M, its side edges being contained in slits or grooves in the inner sides of the side bars of said frame M. Tacks or nails are driven through the frame-bars, where they will pass through the wire-cloth.

Where the whole bottom board is removable, as has been before described, it is necessary, of course, in shipping or transporting bees in the hive to cover the entire bottom with wire-cloth or other perforated material; but as ample ventilation can be secured through the opening left by the removal of but one section of the bottom board I prefer this, as it is in the interest of economy of the wire-cloth or screen required.

My hive-stand is preferably of a size large enough to hold two hives side by side, and it consists of two parallel side pieces N, two parallel end pieces O, the sides and ends being nailed together with their upper edges flush, two parallel cap-pieces P, and four legs Q, one at each corner of the stand, with their upper ends carried high enough to have the cap-pieces rest upon them. All these parts are made of wood, and the legs are arranged so that the grain of the wood runs vertically. The legs are angle or L shaped in cross-section, this form being one that economizes in lumber and one that is admirably suited for the structure, since the legs thus neatly and readily fit the stand-corners. The legs and sides and ends are nailed together. My hive-stand is of simple and inexpensive construction, and it is very strong, so that it will sustain great weight, its strength being due to the fact that the caps on which the weight of the hives rests bear upon the ends of and are supported by the strong legs instead of by the nails which fasten the side and end pieces and the legs. As the cap-pieces provide perfectly flat or smooth surfaces over the entire top of the stand for the hives to rest upon, the latter may be shifted about upon the stand, as may be found desirable or necessary, into any position, and no lifting of the hives is necessary, for they can be slid about to change their positions. The construction also is one that is lasting as far as the effects of the elements are concerned, for the cap-pieces protect the joints from the entrance of water, and the hives themselves resting upon the caps are a protection against the elements. The legs, as indicated by dotted lines in Fig. 1, may be set in cans or receptacles that will hold a liquid that will prevent ants climbing into the hives.

With my hive and stand a queen-excluder of the simplest possible construction can be employed, for, as indicated in dotted lines in Fig. 2, such excluder may consist of a simple strip of perforated zinc R, placed against the entrance to the hive with its lower edge resting on the adjacent cap-surface of the stand and there held by the alighting-board, which is removed from the grooves in the side bar G of the frame-bottom and is laid upon such cap-piece and is tacked there, bearing against the strip of zinc. The latter, near its upper edge, may be tacked to the front of the hive.

Besides the entrance-stop and queen-excluder hereinbefore described the devices illustrated in Figs. 6 to 10 may be used. The one shown in Figs. 6, 7, and 8 may be used alternately for different purposes. It comprises a strip or bar of wood S, having in one edge near each end two notches $s$, a strip $s'$ of perforated zinc, such as is commonly used for queen-excluders, which strip is seated at one edge in a slit or kerf in the wooden strip or bar S, and blocks $s^2$ at each end of the bar or strip S, which blocks are slit for the accommodation of the strip $s'$. A third block $s^2$, similar to the end block $s^2$, is preferably applied to the bar or strip S and the zinc $s'$ at about the longitudinal center thereof. The device thus constructed is long enough to reach from one side bar G of the frame-bottom to the other when placed within the hive-entrance, and it may be placed in such position in the latter as to completely close such entrance except for the small openings provided by the two notches $s$, which latter have such depth as to permit the passage of bees therethrough. The object of having two notches near the ends of the stop is that a better circulation of air is afforded than where a single centrally-located contracted bee-entrance is used. By merely turning over the stop from the position shown in Fig. 7, so that the wooden strip S is downward, giving the stop the position shown in Fig. 8, the stop serves as a drone and queen excluder. Passage of bees through the open grooves that are left when the alighting-board is removed to permit the use of the stop is guarded against by having such grooves completely covered by the ends of the stop. The blocks $s^2$ have such vertical dimension as to place their upper surfaces in either of the two positions of the stop described flush with the tops of the side bars G of the frame-bottom, so that the hive rests upon the blocks $s^2$, and thus securely holds the stop in position. The stop illustrated in Figs. 6, 7, and 8, it is evident, is a very simple and inexpensive structure. It can be used for two purposes, and it is most easily applied and removed.

An extremely simple form of drone and queen excluder is shown in Fig. 9, it comprising merely a wooden strip T, adapted to be slid over the end bar or slat H of the hive-bottom at the entrance when the alighting-board is removed, so as to cover the space over said bar that is left by the removal of the alighting-board, the ends of said strip T entering the grooves in the side bars G of the frame-bottom, and a strip $t$ of perforated zinc of usual construction that stands in a vertical position across the entrance when the device is put in position, as described.

In order to completely close the entrance to the passage of bees, as well as queens and drones, and yet provide for ventilation, the device shown in Fig. 10 is employed, which is exactly like that shown in Fig. 9, excepting that wire-cloth $t'$ of small enough mesh to prevent the passage of bees is used in place of the strip $t$.

To secure the devices shown in Figs. 9 and 10 against accidental dislodgment, a simple latch device U may be employed consisting of a nail bent at right angles having one arm driven into the hive-body to form a pivot, upon which the other arm may be turned to move it into and out of position to overlap the perforated strip.

It will be observed that the three forms of entrance-stops which I have illustrated and described may be applied without the necessity of any nailing or hammering on the hive, knocks or blows upon the hive being seriously objectionable because of their angering or irritating effect upon the bees, so that it is quite an advantage to make unnecessary the use of hammering upon the hive.

Having thus described my invention, what I claim is—

1. As an improvement in beehives, a bottom comprising a frame consisting of side and end bars, and a bottom board, an edge of the bottom board being back of the outer edge of an end bar and said edge of the bottom board being inside the hive, whereby the space at the hive-entrance is increased.

2. As an improvement in beehives, a bottom having side bars with grooves in their inner sides, between the top and bottom edges thereof, so that said grooves have both upper and lower walls and a bottom board engaging such grooves, a space being left between an edge of the bottom board and the ends of the bars adapted to receive an alighting-board and support the same projecting beyond the end of the bottom.

3. As an improvement in beehives, a bottom comprising a frame consisting of grooved side bars and end bars, the grooves of the side bars extending from end to end thereof and a bottom board whose length is substantially less than the length of the side bars, the edges of the bottom board engaging the grooves of the side bars.

4. As an improvement in beehives, a bottom comprising a frame consisting of grooved side bars and end bars, the grooves of the side bars extending from end to end thereof and a bottom board that is substantially less in length than the end bars, and having its edges engaging the grooves of the side bars, the end bars of the frame being on opposite sides of the bottom board.

5. As an improvement in beehives, a bottom comprising grooved side bars and several bottom-forming sections, all of which are situated in the same grooves, and an end one of which is slidable into and out of the grooves of said bars, the remainder being fastened therein.

6. As an improvement in beehives, a bottom comprising side bars, and a bottom board composed of sections mounted on said side bars, an end one of which is removable the remainder being fastened to the bars.

7. As an improvement in beehives, a bottom comprising a frame consisting of grooved side bars and end bars, and a bottom board composed of sections situated in the grooves of the side bars, an end one of the sections being removable the remainder being fastened to the bars.

8. As an improvement in beehives, a bottom comprising a frame formed of parallel side bars, each having an oblique or inclined groove in its inner side and similar end bars, and a bottom board whose side edges are in said grooves, said end bars being, respectively, on opposite sides of the bottom board, said bottom thus constructed being reversible both end for end and top for bottom.

9. As an improvement in beehives, a hive-bottom having side bars not longer than the hive which at the entrance have horizontal grooves, and a removable stop that extends between said bars and enters said grooves.

10. As an improvement in beehives, a bottom comprising a frame consisting of grooved side bars and end bars, and an entrance-stop that extends between the side bars and closes the grooves thereof.

In testimony that I claim the foregoing I have hereunto set my hand.

FRANCIS DANZENBAKER.

Witnesses:
FRANK SPELLMAN,
E. R. ROOT.